May 27, 1958  J. L. GUIDI  2,836,424
AUTOMATIC CENTERING TOOL HOLDER MECHANISM
Filed Nov. 4, 1955
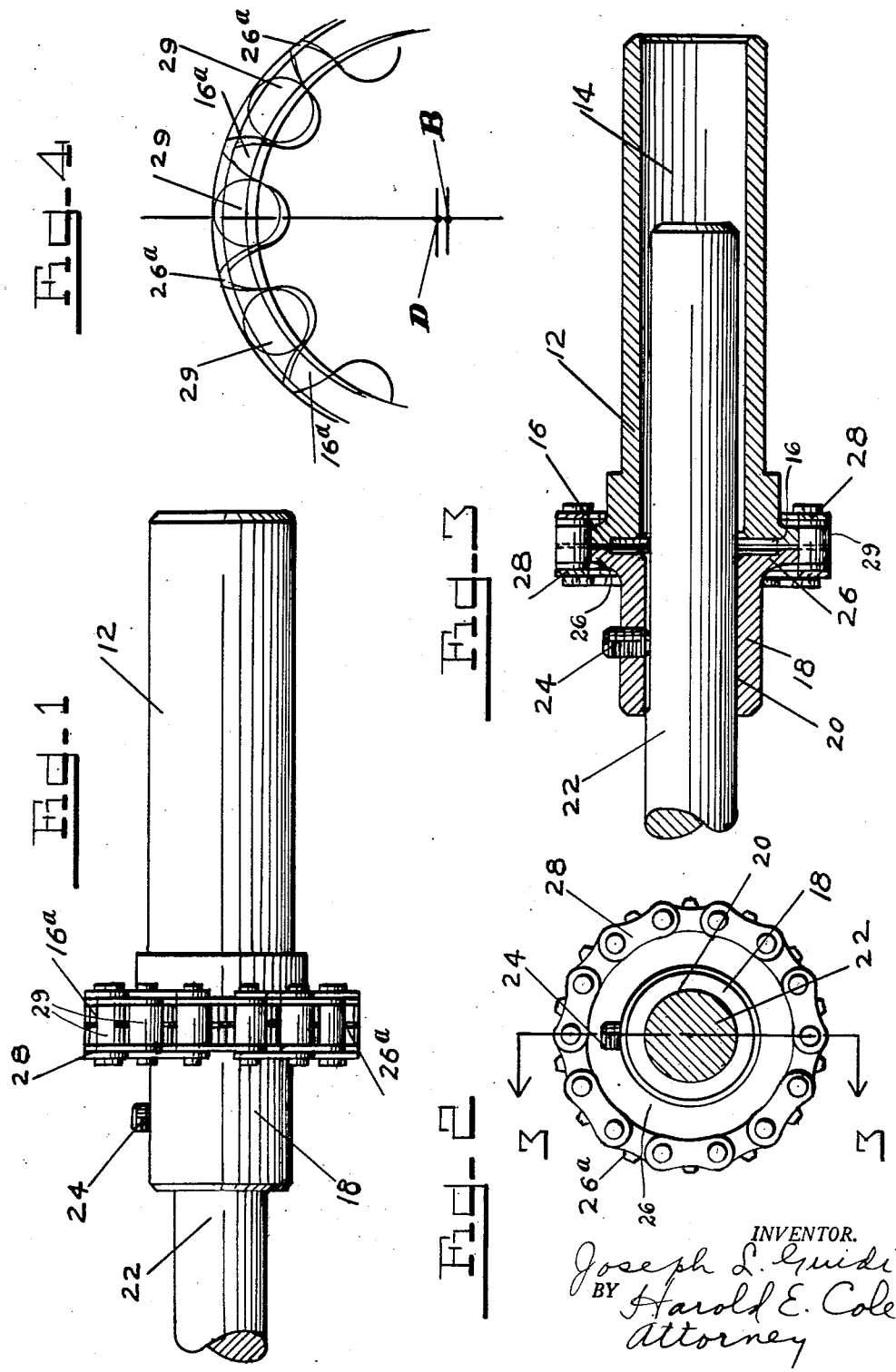
INVENTOR.
Joseph L. Guidi
BY Harold E. Cole
Attorney

United States Patent Office 2,836,424
Patented May 27, 1958

2,836,424

AUTOMATIC CENTERING TOOL HOLDER MECHANISM

Joseph L. Guidi, Somerville, Mass.

Application November 4, 1955, Serial No. 544,985

4 Claims. (Cl. 279—16)

This invention relates to new and useful improvements in automatic centering mechanisms for holders for machine tools, and particularly those tools such as reamers, taps, and the like.

Heretofore, mechanisms of this type required a good part of one revolution of the tool before the correct adjustment would be made, resulting in the cutting tool starting to cut before the adjustment was established thereby making a hole that is tapered out of round, or flared at one end. Thus it was difficult or impossible to hold the tolerances that are demanded today. Also mechanisms of this type were so constructed that the shank of the cutting tool could only enter the mechanism a predetermined distance since the centering mechanism employed blocked the hole and this necessitated making many cutting tools with shanks of different lengths to do the different types of machine work.

One object of this invention is to provide a centering mechanism that functions while stationary and as the work is rotated. Also if it is desired to rotate the centering mechanism, it will be only a fractional part of the revolution of the cutting tool comparable to that required by present mechanisms seeking to achieve accurate centralization.

Another object is to provide a centralizing mechanism that will receive a cutting tool of a long, short or other length of shank because there is a continuous hole through the full length of my holder.

Another object of this invention is to provide a centralizing mechanism that will not make an angle with the center line of rotation of the driving head, which latter is common with any form of universal joint and making it impossible to hold close tolerances. My mechanism does not perform as a universal joint, since the center lines of rotation of the cutting tool of the driving head are substantially parallel, hence do not make an angle with each other. Adjustments during the performances of this invention are automatically made so that the functions of the cutting tool occur when the center lines of rotation of the cutting tool and the driving head are parallel, thus insuring the holding of tolerances and constant production.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawing:

Fig. 1 is a side elevational view of my invention assembled with the shank of the cutting tool shown broken away.

Fig. 2 is an end elevational view of Fig. 1, partly in section, showing the end to which the cutting tool is attached.

Fig. 3 is a longitudinal sectional view of the invention assembled, taken along line 3—3 of Fig. 2, with some parts shown in elevation.

Fig. 4 is a diagrammatic view to aid in describing the performance of the mechanism.

As illustrated, a tool holder driving element 12 is cylindrical and has a hole 14 therethrough extending its full length. A sprocket member 16 is integral with the driving element 12, and has teeth 16a with reduced outer ends.

A tool holder 18 is cylindrical and has a hole 20 of smaller diameter than said hole, and into which the shank 22 of the cutting tool slidably fits. A set screw 24 is threaded in the tool holder 18 and is adapted to locate the shank 22 longitudinally and prevent it from turning relatively to the holder 18. A sprocket member 26 is preferably integral with the tool holder 18 and has teeth 26a which match said teeth 16a, being substantially identical in form, position and size to sprocket teeth 16a. Said holder 18 and driving element 12 may both serve as combined, stationary, retaining elements, merely holding the tool while the work is rotated.

A roller chain 28, having the usual rollers 29, fits over both sprocket members 16 and 26. Since the adjoining faces of the driving head 12 and tool holder 18 are preferably chambered or recessed as at R, and thus slightly spaced from each other, only the faces of the sprocket members 16 and 26 are in sliding contact with each other. The drive from the driving head 12 is transmitted to the tool holder by the roller chain 28, which may be parted at one of its links by any conventional construction.

To assemble the mechanism shank 22 is put into holes 14 and 20 with the faces of sprocket 16 and 26 slidably abutting each other. The roller chain 28 is fitted around both sets of sprocket teeth 16a and 26a and its ends connected by a well known parting link, not shown. The chain 28 holds the abutting faces of sprockets 16 and 26 so that they have a sliding contact with each other, but cannot take up a position so that the axes of rotation of the driving head 12 and the tool holder 18 can make an angle with each other. When the roller chain 28 fits over sprocket teeth 16a and 26a, the space provided between the chain rollers 29 is such as to receive the sprocket teeth 16a and 26a and permit slight movement of the latter laterally, longitudinally and radially in position of use, yet the axes of rotation of the driving head 12 and tool holder 18 must always remain parallel to each other unless the said axes coincide. Sprockets 16 and 26 are so formed as to permit their faces to slide over each other a maximum predetermined amount.

The performance of the mechanism is as follows: If the axes of rotation of the driving head 12 and tool holder 18 do not coincide, the axis of rotation of the tool holder 18 must be out on a radii of the sprocket 16 of the driving head, since the axes of rotation of both the driving head 12 and the tool holder 18 must be kept parallel if they do not coincide. Referring to Fig. 4, B is the axis of rotation of the driving head 12 and D is the axis of rotation of the tool holder 18. Rollers 29 are the rollers of chain 28. The relative positions of the sprocket teeth 16a and 26a are obvious; the outmost outside periphery of sprocket teeth 26a is farther from the center B than the outmost outside periphery of sprocket teeth 16a. Diametrically opposite the center B this condition just described is reversed; the outmost outside periphery of sprocket teeth 16a is farther from center B than the outmost outside periphery of sprocket teeth 26a. It will be obvious from viewing Fig. 4 that driving sprocket teeth 16a will drive driven sprocket teeth 26a when the axis of rotation D of sprocket 26 may be away any infinite number of distances from the axis of rotation B of the driving sprocket 16, within the limits of the mechanism.

In the preceding description of performance, the cutting tool moves and the work remains at rest. However, it is equally applicable when the cutting tool remains at rest and the work moves, in which event the driving head 12 serves as a resisting head 12 since it resists the force transmitted to the cutting tool by the moving work.

First, the cutting tool resists the force the moving work causes. This resisting force is transmitted to the tool holder 18 and the slidable, contacting face of the sprocket member 26 contacts the slidable contacting face of the sprocket member 16, thus sliding over each other and the center lines of the head 12 and tool holder 18 remain parallel. The said resisting force is transmitted by the sprocket teeth 16a of this tool holder 18 to the sprocket teeth 26a of the head 12 by the rollers 29 of roller chain 28. When the center lines of the tool holder 18 and the head 12 remain parallel, the centralization of the cutting tool with the moving work is accomplished.

What I claim is:

1. Tool holder mechanism comprising a first holding element and a second element, each said element embodying a sprocket member having teeth, said teeth of one sprocket member matching the teeth of the other sprocket member, the faces of said sprocket members being in sliding contact with each other, a roller chain embodying rollers spaced apart and encircling both said sprocket members to thereby hold said elements together, said teeth extending into the spaces between said rollers and being of such size relative to said spaces that they are movably retained therein; but so that the axes of rotation of said elements are parallel at all distances from each other.

2. Tool holder mechanism comprising a first holding element and a second element, one end of a said element being adjacent to, but spaced from an end of the other said element, each said element embodying a sprocket member extending radially outward from said adjacent ends the faces of which sprocket members are in sliding contact with each other, a roller chain embodying rollers spaced apart and encircling both of said sprocket members to thereby hold said elements together.

3. Tool holder mechanism comprising a first holding element and a second element, one end of a said element being adjacent to, but spaced from an end of the other said element, each said element embodying a sprocket member radially outward from said adjacent ends the faces of which sprocket members are in sliding contact with each other, each said sprocket member embodying teeth, the teeth of one said sprocket member matching the teeth of the other said sprocket member, a roller chain embodying rollers spaced apart and encircling both of said sprocket members to thereby hold said elements together.

4. Tool holder mechanism comprising a first holding element and a second element, one end of said element being adjacent to, but spaced from an end of the other said element each said element having a hole, but of different diameters, extending longitudinally and completely therethrough and each said element embodying a sprocket member extending radially outward from said adjacent ends the faces of which sprocket members are in sliding contact with each other, each said sprocket member embodying teeth, the teeth of one said sprocket member matching the teeth of the other said sprocket member, a roller chain embodying rollers spaced apart and encircling both of said sprocket members to thereby hold said elements together.

References Cited in the file of this patent

UNITED STATES PATENTS

| | | |
|---|---|---|
| 1,943,791 | Gallamore | Jan. 16, 1934 |
| 2,079,460 | Marty | May 4, 1937 |
| 2,327,604 | McCartney | Aug. 24, 1943 |
| 2,451,683 | Mantle | Oct. 19, 1948 |